(12) United States Patent
Froehlich et al.

(10) Patent No.: US 7,039,559 B2
(45) Date of Patent: May 2, 2006

(54) METHODS AND APPARATUS FOR PERFORMING ADAPTIVE AND ROBUST PREDICTION

(75) Inventors: Steven E. Froehlich, Danbury, CT (US); Joseph L. Hellerstein, Ossining, NY (US); Edwin Richie Lassettre, Los Gatos, CA (US); Todd William Mummert, Carmel, NY (US); Maheswaran Surendra, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 10/385,265

(22) Filed: Mar. 10, 2003

(65) Prior Publication Data

US 2004/0181370 A1   Sep. 16, 2004

(51) Int. Cl.
*G06F 3/05* (2006.01)
(52) U.S. Cl. ............ 702/187; 702/183; 702/188; 702/189
(58) Field of Classification Search ............. 702/128, 702/179, 178, 182, 183, 187, 169, 188; 700/29; 705/1; 709/207; 703/2, 5, 14, 19, 13, 16; 706/45; 707/10; 717/120
See application file for complete search history.

(56) References Cited

U.S. PATENT DOCUMENTS

| | | | |
|---|---|---|---|
| 5,486,995 A * | 1/1996 | Krist et al. ............ 700/29 |
| 5,878,224 A | 3/1999 | Smith ............ 395/200.54 |
| 6,269,078 B1 | 7/2001 | Lakshman et al. ......... 370/230 |
| 6,611,726 B1 * | 8/2003 | Crosswhite ............ 700/99 |
| 6,745,088 B1 * | 6/2004 | Gagne ............ 700/29 |
| 6,745,150 B1 * | 6/2004 | Breiman ............ 702/181 |
| 2004/0181794 A1 | 9/2004 | Coleman et al. .......... 718/104 |

OTHER PUBLICATIONS

U.S. Appl. No. 10/384,973; filed Mar. 10, 2003; D.W. Coleman et al.; entitled "Methods and Apparatus for Managing Computing Deployment in Presence of Variable Workload".*

Yuhong Y. et al.; Combining Time Series Models for Forecasting; Oct., 2001; Department of Statistics Iowa State University; pp. 1-22.*

P. Horn, "Autonomic Computing: IBM's Perspective on the State of Information Technology,"IBM Research, Oct. 2001.

* cited by examiner

*Primary Examiner*—Marc S. Hoff
*Assistant Examiner*—Felix Suarez
(74) *Attorney, Agent, or Firm*—Ryan, Mason & Lewis, LLP

(57) ABSTRACT

Techniques for performing adaptive and robust prediction. Prediction techniques are adaptive in that they use a minimal amount of historical data to make predictions, the amount of data being selectable. The techniques are able to learn quickly about changes in the workload traffic pattern and make predictions, based on such learning, that are useful for proactive response to workload changes. To counter the increased variability in the prediction as a result of using minimal history, robustness is improved by checking model stability at every time interval and revising the model structure as needed to meet designated stability criteria. Furthermore, the short term prediction techniques can be used in conjunction with a long term forecaster.

13 Claims, 5 Drawing Sheets

FIG. 4

6 INTERVAL (60 s) AHEAD TRACKING PREDICTION

◆ ACTUAL DATA
△ ADAPTIVE PREDICTOR (AR ORDER=2, HISTORY=12)

FIG. 5

6 INTERVAL (60 s) AHEAD TRACKING PREDICTION

◆ actBBops
△ ADAPTIVE PREDICTOR (DYNAMIC AR ORDER<=2, HISTORY=12)

METHODS AND APPARATUS FOR PERFORMING ADAPTIVE AND ROBUST PREDICTION

CROSS REFERENCE TO RELATED APPLICATION

The present application is related to U.S. patent application identified by Ser. No. 10/384,973, entitled "Methods and Apparatus for Managing Computing Deployments in Presence of Variable Workloads," filed concurrently herewith, the disclosure of which is incorporated by reference herein.

FIELD OF THE INVENTION

The present invention relates generally to prediction techniques and, more particularly, to techniques for predicting workload levels in accordance with short term time scales, alone or in association with long term time scales, wherein the prediction results may be used, by way of example, to manage deployment of computing resources associated with a computing system or network in the presence of variable workload.

BACKGROUND OF THE INVENTION

An important challenge in managing deployments of computing resources in a computing system or network that is faced with variable workload traffic is the ability to estimate or anticipate future workload. Effective workload prediction would enable a management system (either automated or manual) to allocate appropriate computing resources to meet a workload level increase or, conversely, reduce resource under-utilization in the event of a decreasing workload level.

An existing approach is to use standard seasonal forecasting tools (e.g., seasonal Box-Jenkins models) to forecast anticipated workload over a future time horizon that is characteristic of the underlying time scales or periodicity (e.g., daily, weekly, monthly, etc.) of the historical data.

Significant effort has been channeled towards making these long term forecasts increasingly accurate. Several factors contribute to the accuracy of long term forecasting, including use of extensive historical data (spanning several of the major characteristic cycles, e.g., day, week, month, etc.) and a reasonable time interval (e.g., hour) between successive data points. Each data point is typically an average of workload measurements (e.g., expressed as a queue length or transaction rate) over the time interval. Workload data from computing environments that are described in this manner (e.g., averaged over hour interval) with sufficient history (e.g., days to weeks of data) are amenable to forecasting methods since they are not excessively noisy and have appropriate characteristics (e.g., stationarity, auto correlation over the long term time scales of interest).

However, workload data at much shorter time intervals (e.g., seconds, minutes) can be characterized by significant variability with busy periods interspersed with idle periods that are typically not correlated with each other. Nonetheless, it is important to be able to track the variability of the workload over these short intervals, and be able to react to them (e.g., by rapid provisioning of resources) since they can have deleterious impact on a service objective (e.g., response time) or even cause service outage if sufficient resources are not in place to accommodate the variability.

Unfortunately, existing long term forecasting approaches are not effective in providing workload prediction on such short time scales. There are several reasons for this deficiency including, for example, the relative inability of long term forecasters to adapt quickly to track an unanticipated busy period and, conversely, the tendency to falsely expect a busy period in the future after experiencing several busy periods in its history.

Accordingly, it would be desirable to have adaptive and robust techniques for predicting workload levels in accordance with short term time scales, alone or in association with long term time scales, wherein the prediction results may be used, by way of example, to manage deployment of computing resources associated with a computing system or network in the presence of variable workload.

SUMMARY OF THE INVENTION

The present invention provides adaptive and robust techniques for predicting workload levels in accordance with short term time scales, alone or in association with long term time scales.

In one aspect of the invention, a technique for predicting a future attribute (e.g., workload level) associated with an application comprises the following steps/operations. First, a historical data set associated with the application is obtained for a given time interval. Then, the future attribute is predicted for the given time interval, based on the historical data set, using a prediction model, wherein the prediction model is checked for stability in the given time interval and altered when determined to be unstable.

Preferably, the given time interval is relatively shorter than a time interval used by a seasonal forecasting model. That is, the given time interval may be on the order of approximately a second or a minute. The future attribute may comprise a future workload level. The prediction model may comprise an Auto-Regressive Integrated Moving Average (ARIMA) model. The prediction model may be alterable by reducing an order of the model. The order of the model may be iteratively reducible by an order of one. The predicting step may further comprise the steps of estimating one or more model parameters of the prediction model, checking the stability of the one or more model parameters, altering a structure of the prediction model when the model is considered to be unstable, and calculating the future attribute over a prediction horizon when the model is considered to be stable.

In another aspect of the invention, a technique for predicting a future attribute associated with an application comprises the following steps/operations. First, a historical data set associated with the application is obtained for a given time interval. Second, the future attribute is predicted for the given time interval based on the historical data set. Then, a size of the historical data set is adapted for a subsequent time interval based on a result of the predicting step for the given time interval. Adaptation may also be based on at least one confidence value.

In yet another aspect of the invention, a technique for predicting a future attribute associated with an application comprises the following steps/operations. First, a data set associated with the application is obtained. Forecasting capability is provided for determining the future attribute based on at least a portion of the data set for a first time interval. Prediction capability is also provided for determining the future attribute based on at least a portion of the data set for a second time interval, wherein the second time interval is shorter than the first time interval. Then, a prediction result is output representative of the future attribute based on at least one of the forecasting capability and the prediction capability.

Advantageously, results generated in accordance with prediction techniques of the present invention may be used, by way of example, to manage deployment of computing resources associated with a computing system or network in the presence of variable workload.

The present invention also advantageously provides a methodology for an application owner to attempt to ensure satisfaction of one or more service objectives associated with the execution of an application that is hosted by a service provider. This may be accomplished by the application owner contracting with the service provider to host the application and to implement prediction techniques as provided herein.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of an illustrative computing resource-based network environment. In this illustrative context, computing resources (e.g., application servers, database connections, input/output paths, etc.) associated with one or more applications are automatically or autonomically managed using workload prediction techniques of the invention so as to provide resource deployment to satisfactorily maintain one or more service objectives in the face of variable workload. However, it is to be understood that the invention is not limited to such an environment. Rather, the invention is more generally applicable to any environment in which it would be desirable to provide adaptive and robust prediction techniques. By way of further example, but not limited thereto, the prediction techniques of the invention may be employed for economic or sales forecasting purposes.

As is known, an "application" generally refers to a one or more computer programs designed to perform one or more specific functions, e.g., supply chain management.

As is also known, "autonomic" computing generally refers to a comprehensive and holistic approach to self-managed computing systems with a minimum of human interference, see, e.g., P. Horn, "Autonomic Computing: IBM's Perspective on the State of Information Technology," IBM Research, October 2001, the disclosure of which is incorporated by reference herein. The term derives from the body's autonomic nervous system, which controls key functions without conscious awareness or involvement. More specifically, one of the goals of autonomic computing is to automate some or all of the tasks an expert operator or administrator would typically carry out. Thus, as will be appreciated from the inventive principles presented herein, the prediction techniques of the invention are able to operate automatically or autonomically. However, prediction results of the invention may also be used by expert operators and administrators to manually effect changes in the computing network.

"Service objective" may refer to requirements and/or preferences specified in accordance with a service level agreement (SLA). That is, by way of example, such service objectives may deal with how service applications are hosted at a third party infrastructure, while ensuring a certain level of end-client satisfaction. As is known, businesses increasingly run their applications using infrastructure (e.g., server, network connectivity) provided by a third party, generally referred to as the "service provider." Many companies, such as IBM Global Services, host web sites and/or provide other computer hosting services. An SLA provides a means by which the expectations of the service provider can be negotiated with the customer. An SLA between an application owner and the service provider defines terms and conditions for this hosting service. The SLA may, for example, include expected response time, bandwidth throughput at the network and/or servers, disk space utilization, availability, i.e., up-time of network and server resources, as well recovery time upon failure, and pricing for various levels of service. However, it is to be appreciated that a service objective does not have to come from an SLA, which typically has legal consequences. A service level objective can often be negotiated within an enterprise, e.g., between the information technology (IT) department and the purchasing department for whom they may be deploying an online purchase order system. Also an e-commerce site or even a place like Google may want to maintain a good service level, with regard to something like response time, so that the user experience is good.

Figure 1:
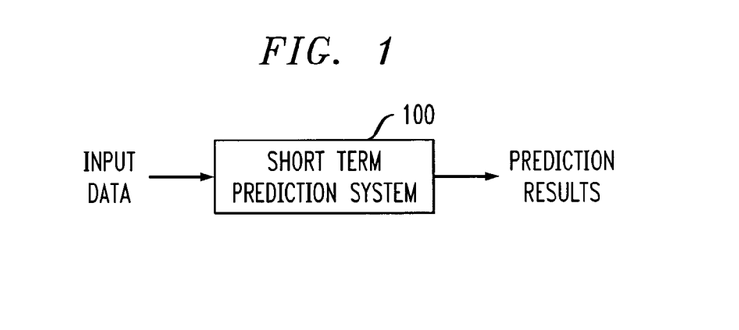
FIG. 1 is a block diagram generally illustrating a short term prediction system and its inputs and output according to an embodiment of the present invention.

Referring initially to FIG. 1, a block diagram generally illustrates a short term prediction system and its inputs and output according to an embodiment of the present invention. In very general terms, as shown in FIG. 1, a short term prediction system 100 employing principles of the present invention generates prediction results based on input data received from some source. In the present example, the data is related to workload (e.g., transaction rate, throughput, response time, etc.) associated with resources of a computing environment. The prediction results generated by system 100 may then be used to determine an appropriate resource deployment that satisfies one or more service objectives.

It is to be appreciated that short term prediction system 100 may be employed in the automated management system described in U.S. patent application identified by Ser. No. 10/384,973, entitled "Methods and Apparatus for Managing Computing Deployments in Presence of Variable Workloads," filed concurrently herewith, the disclosure of which is incorporated by reference herein. However, it is important to note that the prediction system and prediction results of the invention may be used independent of any management system. Also, it is to be understood that the prediction results may also be used by expert operators or administrators to manually effect changes in the system to which they are providing their administration services.

As will be evident from the following descriptions, the short term prediction techniques of the present invention may be adaptive in that they use a minimal amount of history to make predictions. The techniques are able to learn quickly about changes in the workload traffic pattern and make predictions, based on such learning, that are useful for proactive response to workload changes.

To counter the increased variability in the prediction as a result of using minimal history, robustness may be improved by checking model stability at every time interval and revising the model structure as needed to meet designated stability criteria. Further, robustness can be achieved by not just smoothing/filtering the input history and/or the output prediction, but also the actions that are based on the predictions.

Furthermore, as will be illustrated later, the short term prediction techniques of the invention can be used in conjunction with a long term forecaster since the time intervals of interest for prediction (e.g., seconds, minutes) are distinct/ separable from long term forecasting (e.g., hours, days, weeks). For instance, the short term predictor may be used to estimate workload within the long term time interval used by a long term forecaster, since each long term time interval (e.g., hour) would be made up of many short term time intervals (e.g., minute). Further, as will be seen, short term prediction results and long term prediction results may be evaluated to determine which results are best for subsequent use, given the task at hand. Still further, another important consideration is how to base actions on the predicted values. In accordance with the invention, the relative importance in terms of decision making may be determined by using confidence bounds on the predictions from the long term forecaster and short term predictor, respectively. If the current observed (actual) values for workload are outside the confidence bounds of the predicted value from the long term forecaster for the current interval, more weight is given to the predictions of the short term predictor, and vice versa.

In addition, the confidence bound on the predictions from the short term predictor, especially as they relate to whether they bracket the current observed (actual) values for workload, also may serve as input to adapt the short term predictor. Here too, a consideration is how much data to use as the history (i.e., history size or "nhist") for the short term predictor. As will be further discussed below, the variability (e.g., square of standard deviation) of the prediction approximately scales with 1/squareroot(nhist). In other words, for example, the prediction is approximately equal to 1/squareroot(nhist) to within multiplicative and/or additive factors. However, a bigger nhist also makes the short term predictor more sluggish and slow to respond to rapid changes. Hence, for example, if the data for the current time (and/or very recent history) is outside the appropriate confidence bounds (e.g., +/− one standard deviation), then it may suggest that the history being used for the short term predictor is too long, and should be shortened so as not to excessively lag the actual data in a surge. However, one should be mindful of validity criteria, to be further discussed below. If the data for the current time is outside the validity bounds (e.g., +/− several standard deviations), then the conclusion may well be that the data is not valid, as opposed to the history being too long.

In a preferred embodiment of the present invention, the adaptive and robust short term predictor uses a non-seasonal Auto-Regressive Integrated Moving Average (ARIMA) model to do prediction based on a relatively, very short history. In the strictest sense, the absolute minimum amount of data is set by how much data is needed to uniquely calculate the model parameters, e.g., making sure that the multiple linear regression approach discussed below can uniquely determine the model parameters. However, in a practical implementation, this may be too low, since the predictions based on this amount of data may have an excessively high standard deviation (and hence very wide confidence bounds). The ARIMA model can be an effective extrapolator, although the time series over short time scales is typically not stationary. However, given that only a short history is used for doing the prediction, the invention realizes that the time series can be considered to be locally stationary. This approximation may be further improved by applying techniques to improve stationarity, such as first or second order differencing. Details on the ARIMA model, in general, may be found in "Time Series Analysis: Forecasting and Control," by G. E. P. Box et al. (rev. ed.), the disclosure of which is incorporated by reference herein.

Again, as mentioned above, the short term predictor may be used in conjunction with a long term forecaster that has a time interval significantly longer than that of interest for the short term predictor. The type of surges discussed below would typically be significantly averaged out over the long time interval of the long term forecaster. Hence, the predictions from the long term forecaster would be less exposed to the type of "ghost" problems discussed below.

The primary parameters in the approach for the short term predictor include the orders of the model, i.e., ARIMA(p,d, q), where p is the order of autoregressive (AR) part, d is the number of non-seasonal differences (I), q is the order of the moving average (MA) part, and the amount of history (nhist intervals) used. The amount of history directly affects the amount of variability in the prediction (variability approximately scales with 1/squareroot(nhist)), and the responsiveness of the model to sudden traffic changes. Another factor to consider is the choice of the prediction horizon, i.e., the number of intervals ahead that the prediction is supposed to go, since the variability in the prediction approximately scales with the square root of npred, where npred is the prediction horizon.

Figure 2:
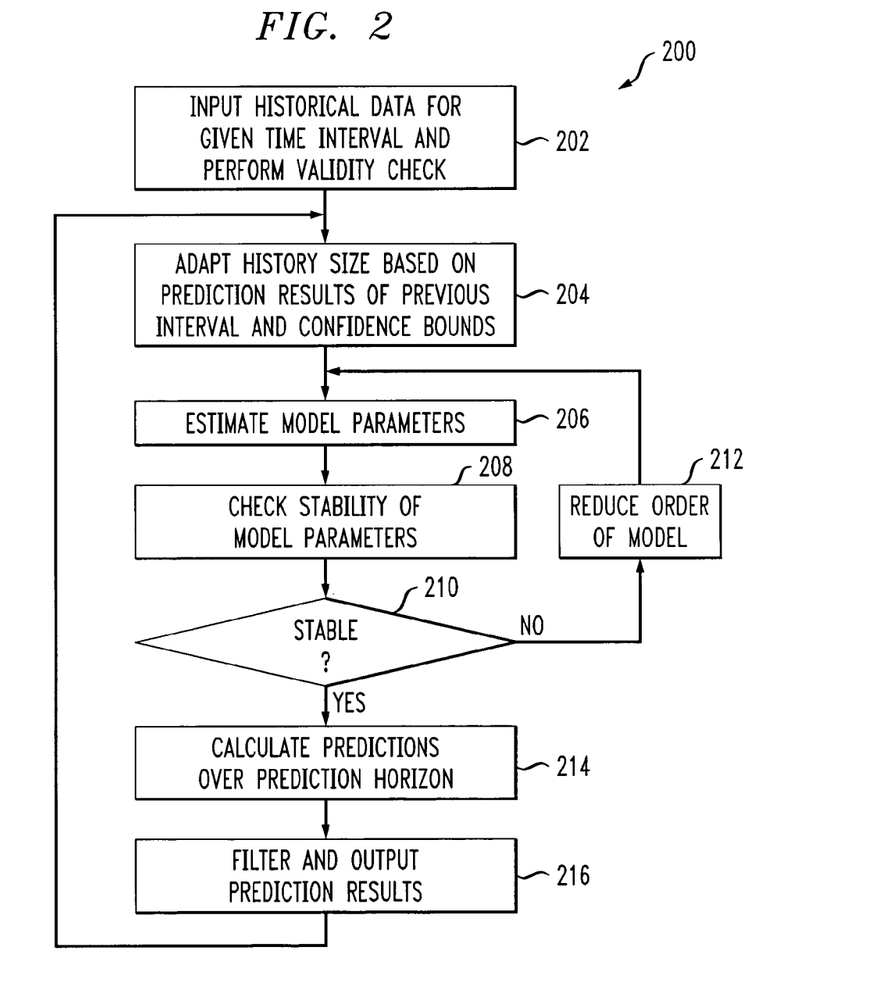
FIG. 2 is a flow diagram illustrating a short term prediction methodology according to an embodiment of the present invention.

Referring now to FIG. 2, a flow diagram illustrates a short term prediction methodology according to an embodiment of the present invention. It is to be understood that the methodology of FIG. 2 may be employed in short term prediction system 100 of FIG. 1. In general, as will be evident in this embodiment, the ARIMA model is fitted to the history data and the parameters in the model are estimated using standard techniques.

As shown in methodology 200 of FIG. 1, at every short term interval, data is input and subject to a validity check to exclude undesirable data in step 202. Any suitable validity checks may be performed here. For instance, if the data includes transaction rates, then negative numbers are not valid. The criteria for accepting the current data could also be based on whether it is within a very wide confidence (e.g., 99% or more) bound of the prediction for the current time (and/or very recent history) based on past data. Note that since the prediction system is preferably designed to be able to track/predict rapid change, one does not want to make this data validity check too stringent, since that might lead to rejection of leading data in an incipient surge. A reasonable type of check may be to use a 99% (approximately +/− several standard deviations) confidence bound of the one interval ahead prediction from the short term predictor as the acceptance criteria.

In step 204, the history size is adapted based on prediction results of the previous interval and confidence bounds. This will be discussed further below. It is to be understood that the amount of historical data can alternatively be fixed.

Next, in step 206, the model parameters are estimated based on the historical data set identified for use in step 204. Estimation of the parameters of the ARIMA model may be accomplished by known multiple linear regression techniques, which may include least squares fitting methods. By way of one example, estimation techniques described in "Probability and Statistics for Engineers and Scientists" by Ronald E. Walpole et al., 4th ed., the disclosure of which is incorporated by reference herein, may be employed.

Then, the parameters of the model are checked for stability (i.e., robustness check) in step 208. One way to accomplish this robustness check is to observe the roots (which can be complex) of the characteristic ARIMA equation (e.g., given below). By way of example, root calculation techniques described in "Numerical Recipes in C: The Art of Scientific Computing" by William H. Press et al., 2nd ed., the disclosure of which is incorporated by reference herein, may be employed.

As illustrated at decision block 210, if the roots are outside the range considered appropriate, typically, the unit circle, the model is considered unstable. Then, the AR order of the ARIMA model is reduced (e.g., from (2,1,0) to (1,1,0)) in step 212. Steps 206, 208 and 210 are then repeated.

Once the stability criteria are passed (i.e., the model is considered stable), then the predictions over the prediction horizon are calculated in step 214. Lastly, the prediction results may be filtered, as will be discussed below, and output in step 216 for subsequent use (e.g., by associated automated management system, expert operator, etc.). Also, as explained above, the prediction results for the current interval may be used in step 204, in accordance with pre-established confidence bounds, to adapt the history size of the next prediction interval.

Figure 3:
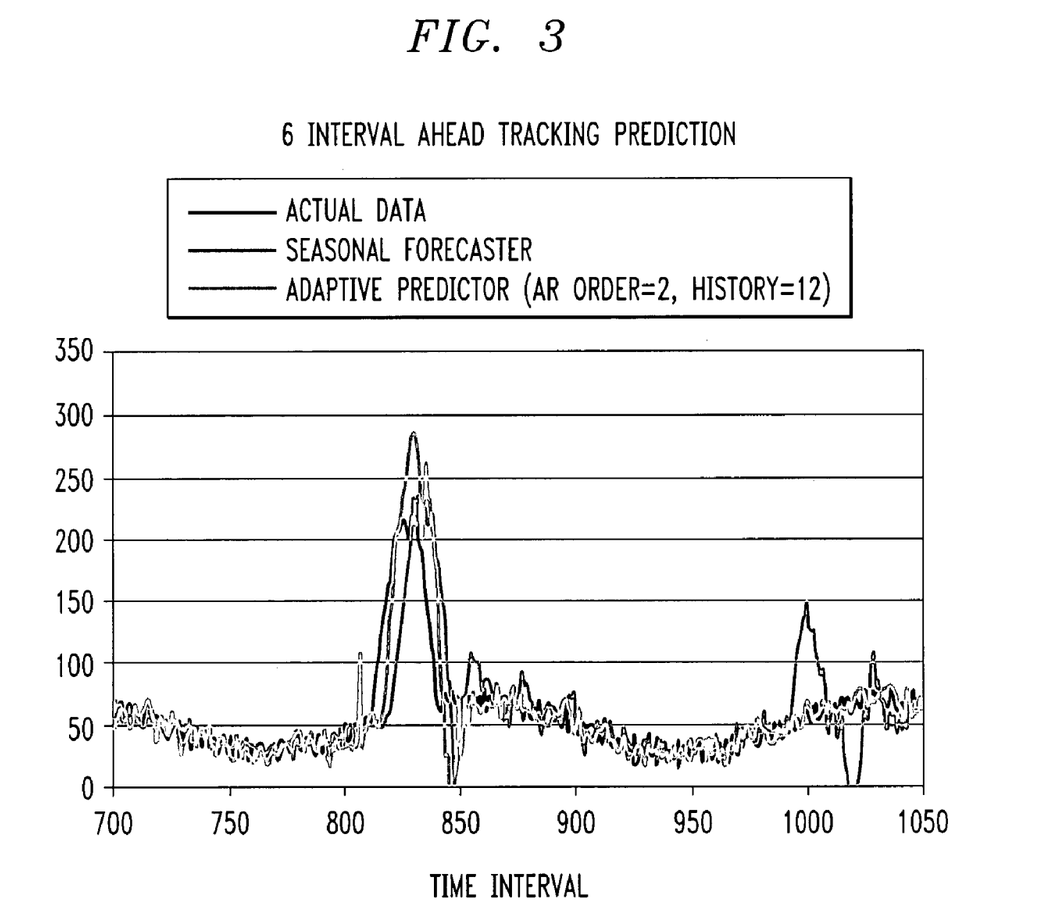
FIG. 3 is a graphical representation illustrating differences in prediction results associated with long term forecasting and short term prediction in accordance with principles of the present invention.

FIG. 3 depicts illustrative prediction results. For example, in FIG. 3, the adaptive predictor model is an ARIMA(2,1,0) model, i.e., an AR model (order 2) of a first order differenced time series. If t is the current time, and the nhist is 12, then the time series for model fitting is [y(t), y(t−1), y(t−2), . . . , y(t−10)], where the first order difference y(t)=Y(t)−Y(t−1) of the original time series, Y(t) is used. The AR(2) model equation for estimating Y at time t+1 is y'(t+1)=C+a1y(t)+a2y(t−1), where C, a1, and a2 are m parameters, and y'(t+1)=Y'(t+1)−Y(t), where the ' denotes the predicted value.

In this case, model parameters are easily estimated (e.g., step 206 of FIG. 2) at each time using ordinary least squares methods since the model fitting resembles multiple linear regression:

$$y(t)=C+a1y(t-1)+a2y(t-2)$$

$$y(t-1)=C+a1y(t-2)+a2y(t-3)$$

.

.

.

$$y(t-8)=C+a1y(t-9)+a2y(t-10).$$

Further, as mentioned above, the history used for the short term predictor may be made adaptive by using the confidence bounds for predictions from the short term predictor (e.g., step 204 of FIG. 2). As discussed above, the variability in the prediction is inversely related to the amount of history, and is a trade-off for predictor responsiveness to rapid changes. In one example, the history, albeit short, for the short term predictor is chosen to keep the prediction variability within some expected range. However, the amount of historical data used is changed if the current observed (actual) workload values are outside the confidence bounds of the predicted values, which indicates that the system is facing some extremely rapid change. Changing the predictor model structure in this manner is also made in concert with robustness considerations, also explained above.

The effectiveness of the inventive prediction techniques to adapt/learn about a sudden surge (characteristic of a busy period in workload traffic) in an otherwise relatively well behaved seasonal traffic pattern is shown in FIG. 3. Here, the prediction horizon is six intervals (in this case, sufficient time for actions such as provisioning of additional resources to handle the surge). The adaptive short term predictor is capable of learning sufficiently quickly (within just a few intervals into the surge) to give useful information about the expected evolution of the surge. In contrast, some of the dangers of using a long term seasonal forecaster on the same time interval (granularity) as the short term predictor are shown in FIG. 3.

As is evident in FIG. 3, the seasonal forecaster (which has several hundred points in its history), while faithfully reproducing the shape of the surge, lags the actual surge by the prediction interval, hence provides no useful information on which action can be taken. In addition, another unfortunate outcome of the seasonal forecaster is that it remembers the occurrence of the surge, and expects it to reoccur later, as is apparent around interval 1000 in FIG. 3. The adaptive short term predictor does not have this problem with predicting "ghost" surges far into the future since it is almost memoryless.

An artifact of the adaptive short term predictor is its tendency to overshoot, e.g., the peak of the surge and also the end of the surge, which is not unexpected given the extrapolating nature of the model. Since a primary purpose of the prediction is to guide proactive actions to manage the unanticipated surge, damping/filters (as mentioned above in the context of step 216 of FIG. 2) can be applied to the prediction and also prescribed actions, as appropriate. By way of one example, a low pass filter module may be added to the output of the short term predictor to accomplish this result. Filtering such as described in "Digital Filters" by Richard W. Hamming, 2nd ed., the disclosure of which is incorporated by reference herein, may be employed.

In the case of workload traffic incoming to a computing deployment, where the action would typically be to provision additional resources (e.g., servers), appropriate damping in the provisioning action (e.g., limit the number of added servers) can be used to reduce exposure to overshoot. Also, the end of the surge, where the prediction is below the actual data, is not an issue, since the number of servers needed to handle the workload would typically be based on a filtered value such as max[Y(t), Y'(t+1), Y'(t+2), Y'(t+3), . . . , Y'(t+npred)].

The invention further realizes that another key aspect of building an effective adaptive short term predictor is to make the predictor robust towards excessive variability in the predictions, especially given that the model design is biased toward rapid learning/adaptability. An example of excessive noise from FIG. 3 is the spike in the values from the adaptive short predictor at around interval 810, which is before the occurrence of the surge.

Robustness of the adaptive short term predictor is improved by checking the stability of the predictor model (e.g., steps 208 and 210 of FIG. 2). Typically, higher order ARIMA(p,d,q) models are more prone to instability. The stability of the model can be assessed by looking at the roots of the characteristic equation of the ARIMA model. As explained above, if the roots of the characteristic equation are outside the unit circle in the complex plane, then the model can be considered to be formally unstable. While the true impact of an unstable model is not fully experienced in the model predictions since the model parameters are recalculated at every interval, predictions from unstable models from just one or two time intervals can lead to undesirable consequences, such as the addition of unneeded resources as a result of a spurious spike in the prediction.

Hence, in accordance with the inventive approach, when the roots of the characteristic equation are outside the unit circle in the complex plane (a smaller circle can be used too, since prediction variability increases as the roots approach the unit circle), the order of the model is reduced by one, model parameters are recalculated, and the roots of the lower order model are again checked for stability. This procedure is repeated until stable roots are found. The procedure converges since the ARIMA(0,1,0) model is stable. However, lower order models are less aggressive about adapting to changes, especially the ARIMA(0,1,0) model.

In the example below, as in the previous example above, the adaptive short term predictor is an AR model of order two. The characteristic equation for this model is $1-a_1q^{-1}-a_2q^{-2}=0$ or $q^2-a_1q-a_2=0$, where q is the shift operator: $q[y(t-1)]=y(t)$.

Figure 4:
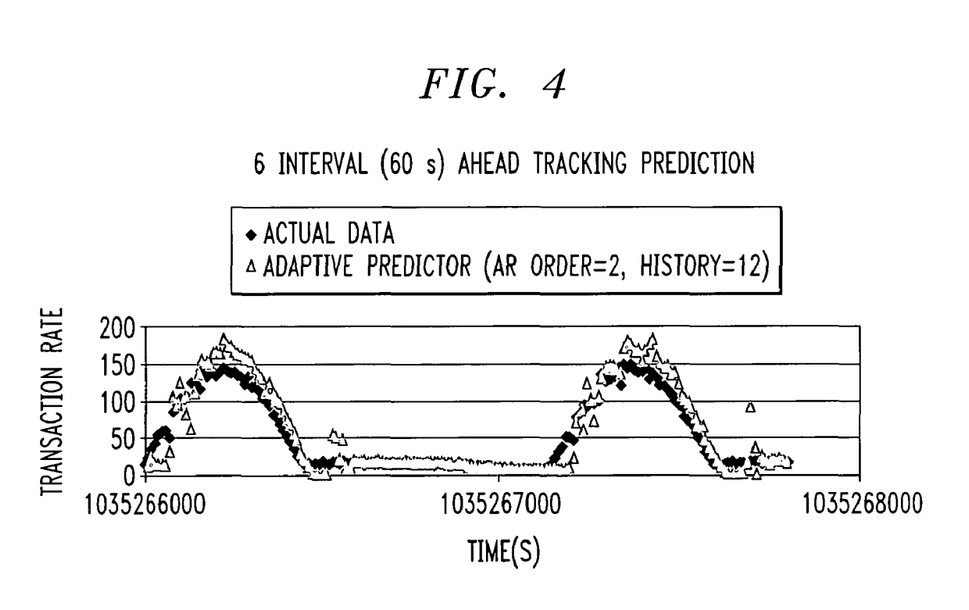
FIG. 4 is a graphical representation illustrating prediction results associated with short term prediction in accordance with principles of the present invention.
Figure 5:
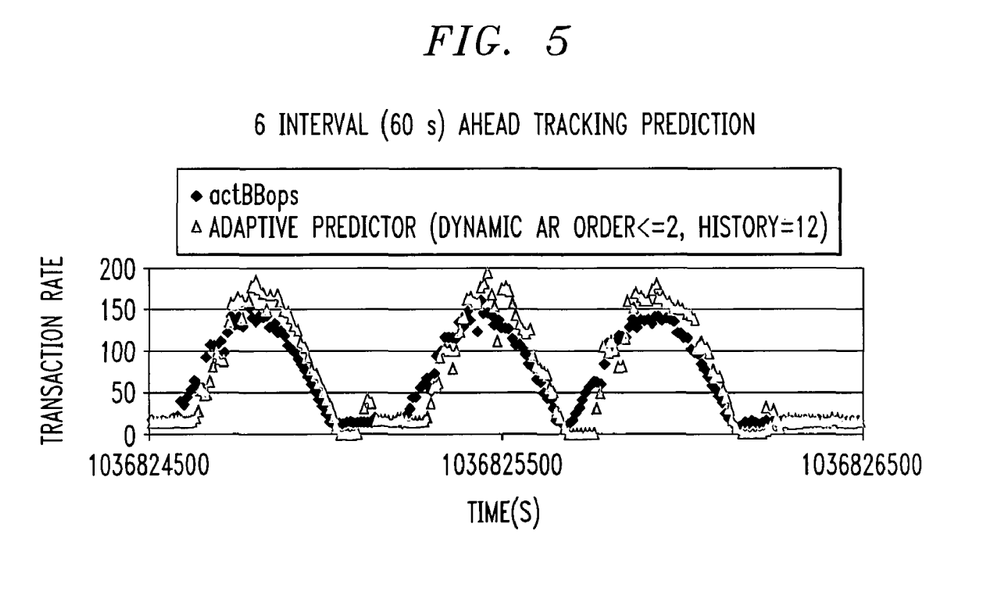
FIG. 5 is a graphical representation illustrating further prediction results associated with short term prediction in accordance with principles of the present invention.

In FIG. 4, the order of the AR model is fixed at two, and some large spikes in the prediction are apparent after the end of the surge (note the large spike after the end of the second surge). In comparison, in FIG. 5, the order of the model is lowered below two if the model is considered to be unstable. While this does not completely eliminate the spikes, it does reduce them, and is hence more robust.

Given the illustrative explanations of the adaptive and robust prediction principles of the invention, an embodiment in which short term prediction is employed in conjunction with long term forecasting will now be described.

Figure 6:
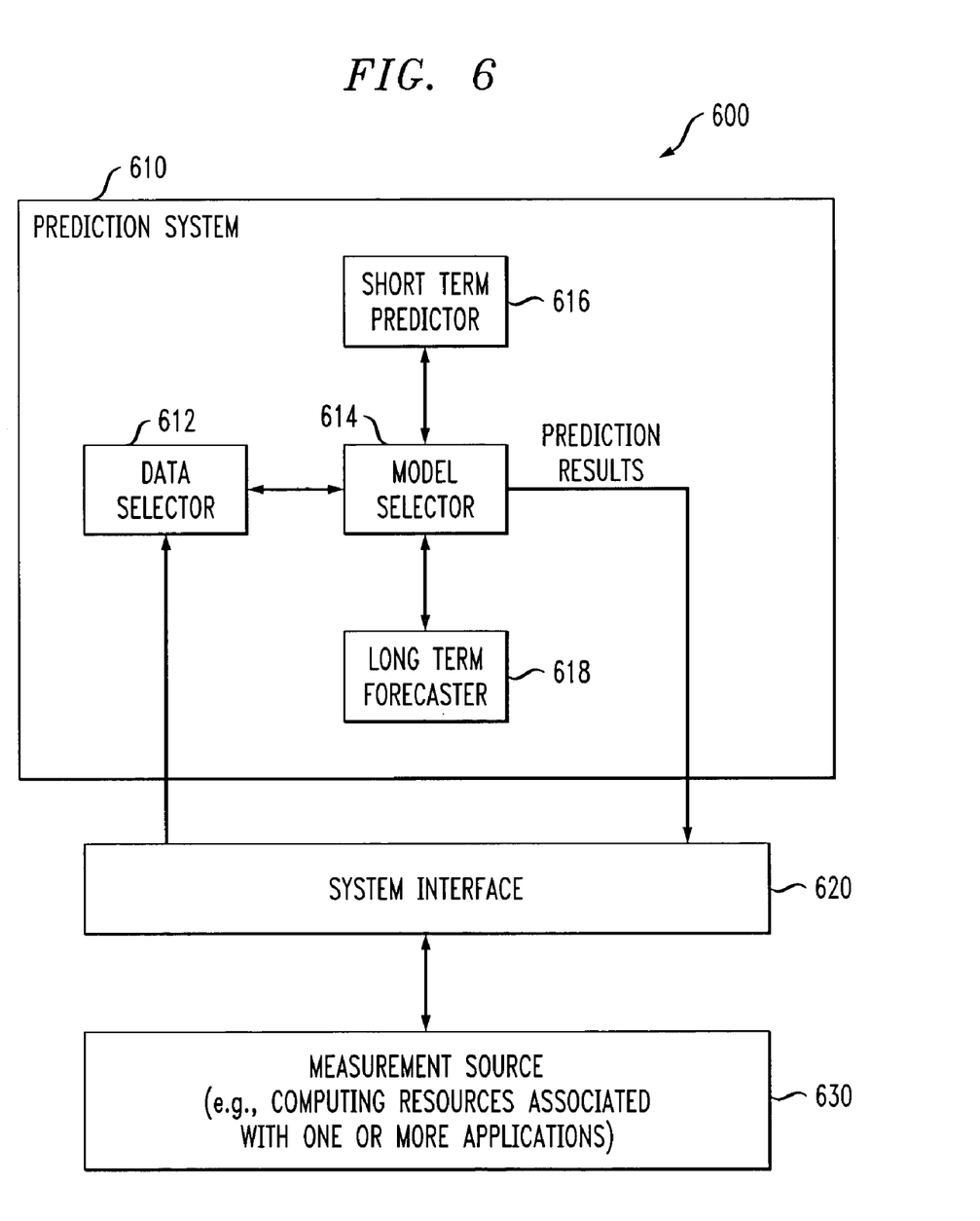
FIG. 6 is a block diagram illustrating a prediction system and an overall environment in which such system may operate according to an embodiment of the present invention.

Referring now to FIG. 6, a block diagram illustrates a prediction system according to an embodiment of the present invention and an overall illustrative environment in which such system may operate. As shown, illustrative environment 600 comprises a prediction system 610, a system interface 620 and a measurement source 630. The prediction system 610, itself, comprises a data selector 612, a model selector 614, a short term predictor 616, and a long term forecaster 618.

Short term predictor 616 preferably employs the short term prediction techniques described above, while the long term forecaster employs known seasonal forecasting techniques, see, e.g., the G. E. P. Box et al. reference cited above. As will be evident, prediction system 610 may output prediction results from either the short term predictor or the long term forecaster, or system 610 may output both sets of results.

That is, in general, the short term predictor and long term forecaster may be run together, albeit at different frequencies, since the interval for the short term predictor is much shorter than that of the long term forecaster. Then, a decision is made as to which prediction to use based on how each approach (short term predictor versus long term forecaster) has been performing for the current data. This last step looks at whether the actual data for current and/or very recent history is within the appropriate confidence bounds for the predicted values for the current time and/or very recent history.

Advantageously, the invention provides a system which may employ long term forecasting, but which overcomes the disadvantages known to exist with long term forecasting by employing adaptive and robust short term prediction techniques therewith.

Further, it is to be understood that prediction system 610 performs workload prediction based on historical data relating to some measurement source 630. In the illustrative example discussed herein, the measurement source may preferably comprise computing resources associated with one or more applications being executed in accordance with the computing resources. Examples of resources may be application servers, database connections, input/output paths, etc. However, it is to be understood that the invention is not limited to any particular resources or, more generally, to any type of measurement source. Rather, the invention may manage any and all types of sources including, but not limited to, hardware components, software components, and combinations thereof. It is also to be understood that a resource may also be an application, itself, or some portion thereof.

Again, in the context of the use of results from prediction system 610 in managing deployment (e.g., adding/removing) of computing resources so as to satisfactorily maintain service objectives associated with the execution of an application, it should be understood that system interface 620 may serve several functions. First, system interface 620 may comprise monitoring functions (e.g., through resource-dependent sensors such as, for example, response time probes, vmstat data from the operating system such as Unix, snapshot data from a database such as IBM Corporation's DB2, or through custom interfaces or standard interfaces implemented using the Common Information Model) for obtaining data, associated with the computing resources, that is used by prediction system 610. Second, system interface 620 may comprise decision functions for deciding what action or actions need to be taken with respect to the computing resources given the prediction results. Third, system interface 620 may comprise deployment functions (e.g., through resource-dependent effectuators such as, for example, the node agent on an application server such as IBM Corporation's WebSphere Application Server, the application programming interface for changing configuration parameters in a database such as IBM Corporation's DB2) for causing the implementation of the actions. Such actions may, for example, comprise resource provisioning (e.g., adding one or more resources to the current deployment to satisfy a service objective based on the predicted future workload, removing one or more resources from the current deployment to satisfy a service objective based on the predicted future workload), resource tuning and/or admission control (throttling).

It is to be appreciated that prediction system 610 and system interface 620 may generally form a management system for automatically or autonomically managing deployment of computer resources. Further, prediction system 610 may be employed in the management system described in U.S. patent application identified by Ser. No. 10/384,973, entitled "Methods and Apparatus for Managing Computing Deployments in Presence of Variable Workloads," filed concurrently herewith, the disclosure of which is incorporated by reference herein. However, it is important to note that the prediction system and prediction results of the invention may be used independent of any management system.

Figure 7:
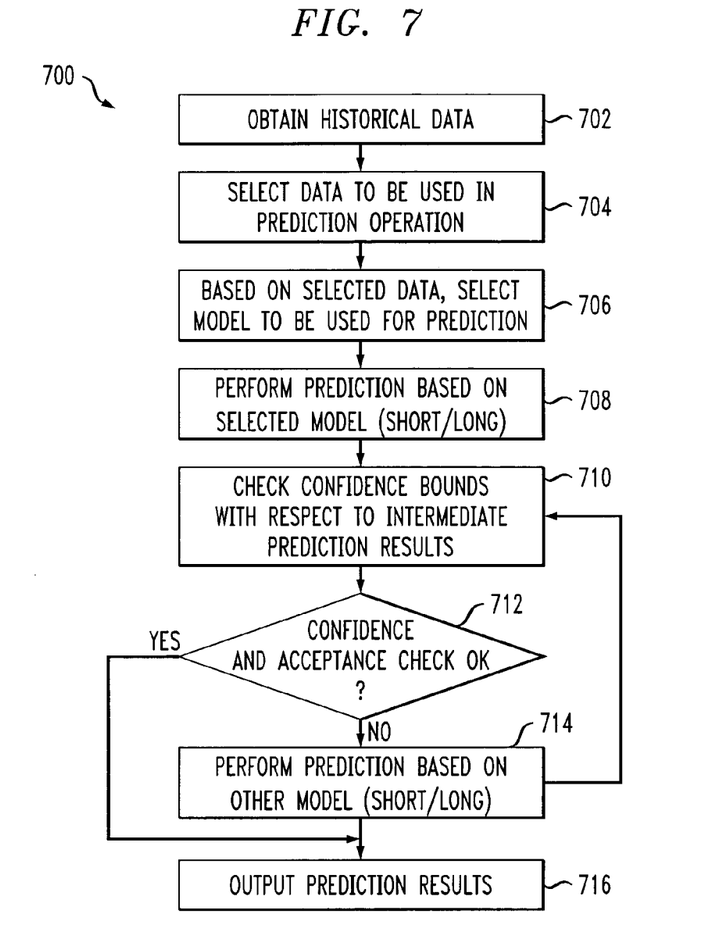
FIG. 7 is a flow diagram illustrating a prediction methodology according to an embodiment of the present invention.

Referring now to FIG. 7, a flow diagram illustrates a prediction methodology according to an embodiment of the present invention. The methodology will be described in the context of the components of prediction system 610 of FIG. 6.

As shown, the methodology 700 begins in step 702 by obtaining historical data. The data may be obtained via system interface 620 from the measurement source 630. Data to be used in the prediction operation is then selected (via data selector 612) in step 704. Criteria for selecting data may be similar to the validity check criteria mentioned above with respect to step 202 of FIG. 2.

Based on the selected data and the predetermined prediction horizon, the model to be used for prediction is selected (via model selector 614) in step 706. That is, a determination is made whether to use the model of the short term predictor 616 or the model of the long term forecaster 618. In step 708, prediction is performed based on the selected model. The prediction operations are carried out by the respective modules 616 or 618, and the results are returned to the model selector module 614. The results output by module 614 represent intermediate prediction results.

In step 710, the intermediate results are checked against confidence bounds and acceptance criteria. Such checks may be performed in the model selector 614 and/or in the respective modules 616 and 618. If the confidence/acceptance check (step 712) is satisfactory, then the prediction results are output as final results in step 716. However, if the confidence/acceptance check is not satisfactory, prediction is performed based on the other (originally, non-selected) of the models in step 714. Steps 710 and 712 are repeated and, if the results are satisfactory, these results are then output as final results in step 716.

It is to be appreciated that in an alternative embodiment, both short term and long term models may be used. That is, both short term prediction and long term forecasting are performed on input historical data, for different intervals, and then model selector 614 decides which prediction to use based on how each approach (short term predictor 616 versus long term forecaster 618) has performed for the current data. Such a confidence/acceptance test may look at whether the actual data for current and/or very recent history is within the appropriate confidence bounds for the predicted values for the current time and/or very recent history. Based on which model is performing better for the given data set under consideration, the prediction results corresponding to that model are then output by the prediction system 610. However, as mentioned above, both sets of prediction results may be output.

Figure 8:
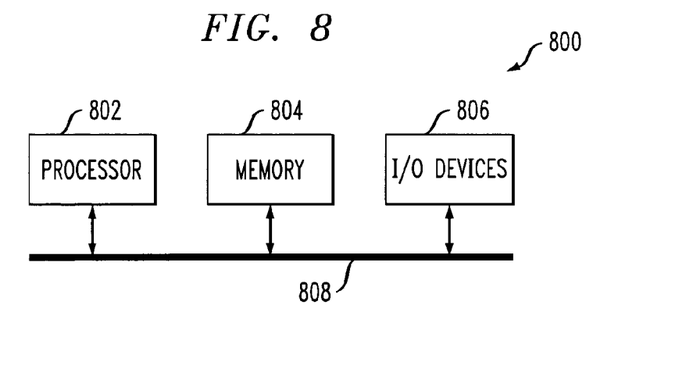
FIG. 8 is a block diagram illustrating a generalized hardware architecture of a computer system suitable for implementing a prediction system according to the present invention.

Referring now to FIG. 8, a block diagram illustrates a generalized hardware architecture of a computer system suitable for implementing a prediction system according to the present invention, as well as a management system implementing the prediction techniques of the invention. For instance, the functional components shown in FIGS. 1 and 6 with respect to prediction system 100, prediction system 610 and system interface 620 may be implemented on one or more computer systems of the type shown in FIG. 8. Of course, separate functional components may be implemented on their own dedicated computer system. However, it is to be appreciated that the prediction system of the invention is not intended to be limited to any particular computer platform, arrangement or implementation. Also, the components shown in FIGS. 1 and 6 may be implemented in a client-server arrangement in accordance with the Internet or World Wide Web.

In this illustrative implementation 800, a processor 802 for implementing prediction and management methodologies and functionalities of the invention as described herein is operatively coupled to a memory 804 and input/output (I/O) devices 806, via a bus 808 or an alternative connection arrangement. It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc. The memory may preferably be used to store data and computer programs associated with the invention.

In addition, the term "I/O devices" as used herein is intended to include one or more input devices (e.g., keyboard, mouse) for inputting data to the processing unit, as well as one or more output devices (e.g., CRT display) for providing results associated with the processing unit.

It is to be appreciated that the methodologies of the present invention are capable of being implemented in the form of computer readable media. The term "computer readable media" as used herein is intended to include recordable-type media, such as, for example, a floppy disk, a hard disk drive, RAM, compact disk (CD) ROM, etc., as well as transmission-type media.

Accordingly, one or more computer programs, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 402.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope or spirit of the invention.

What is claimed is:

1. An automated method of predicting a future attribute associated with an application, the method comprising the steps of:

obtaining a historical data set associated with the application for a given time interval; and predicting the future attribute for the given time interval, based on the historical data set, using a prediction model, the prediction model being checked for stability in the given time interval and altered when determined to be unstable;

wherein the given time interval is relatively shorter than a time interval used by a seasonal forecasting model.

2. The method of claim 1, further comprising the step of adapting a size of the historical data set for a subsequent time interval based on a result of the predicting step for the given time interval.

3. The method of claim 2, wherein the size of the historical data set is also adapted based on at least one confidence value.

4. An automated method of predicting a future attribute associated with an application, the method comprising the steps of:

obtaining a historical data set associated with the application for a given time interval; and predicting the future attribute for the given time interval, based on the historical data set, using a prediction model, the prediction model being checked for stability in the given time interval and altered when determined to be unstable;

wherein the given time interval is approximately one of a second and a minute.

5. An automated method of predicting a future attribute associated with an application, the method comprising the steps of:

obtaining a historical data set associated with the application for a given time interval; and predicting the future attribute for the given time interval, based on the historical data set, using a prediction model, the prediction model being checked for stability in the given time interval and altered when determined to be unstable;

wherein the future attribute comprises a future workload level.

6. The method of claim 1, wherein the prediction model comprises an Auto-Regressive Integrated Moving Average (ARIMA) model.

7. The method of claim 1, wherein the prediction model is alterable by reducing an order of the model.

8. The method of claim 1, wherein the order of the model is iteratively reducible by an order of one.

9. The method of claim 1, wherein the predicting step further comprises the steps of:

estimating one or more model parameters of the prediction model;

checking the stability of the one or more model parameters;

altering a structure of the prediction model when the model is considered to be unstable; and calculating the future attribute over a prediction horizon when the model is considered to be stable.

10. Apparatus for predicting a future attribute associated with an application, the apparatus comprising:

a memory; and at least one processor coupled to the memory and operative to: (i) obtain a historical data set associated with the application for a given time interval; and (ii) predict the future attribute for the given time interval, based on the historical data set, using a prediction model, the prediction model being checked for stability in the given time interval and altered when determined to be unstable;

wherein the given time interval is relatively shorter than a time interval used by a seasonal forecasting model.

11. An article of manufacture for predicting a future attribute associated with an application, comprising a machine readable medium containing one or more programs which when executed implement the steps of:

obtaining a historical data set associated with the application for a given time interval; and predicting the future attribute for the given time interval, based on the historical data set, using a prediction model, the prediction model being checked for stability in the given time interval and altered when determined to be unstable;

wherein the given time interval is relatively shorter than a time interval used by a seasonal forecasting model.

12. A method of attempting to ensure satisfaction of one or more service objectives associated with the execution of an application, the method comprising the steps of:

contracting a service provider to host the application in accordance with the one or more service objectives; and contracting the service provider to implement an automated system for predicting a future workload level associated with the application, the system being operative to: (i) obtain a historical data set associated with the application for a given time interval; and (ii) predict the future workload level for the given time interval, based on the historical data set, using a prediction model, the prediction model being checked for stability in the given time interval and altered when determined to be unstable;

wherein the given time interval is relatively shorter than a time interval used by a seasonal forecasting model.

13. An automated method of predicting a future attribute associated with an application, the method comprising the steps of:

obtaining a historical data set associated with the application for a given time interval; and predicting the future attribute for the given time interval, based on the historical data set, using a prediction model, the prediction model being checked for stability in the given time interval and altered when determined to be unstable.

* * * * *